July 24, 1928.
H. S. MYERS
1,678,158
HOIST ATTACHMENT FOR TRACTORS
Original Filed Oct. 10, 1922    2 Sheets-Sheet 1
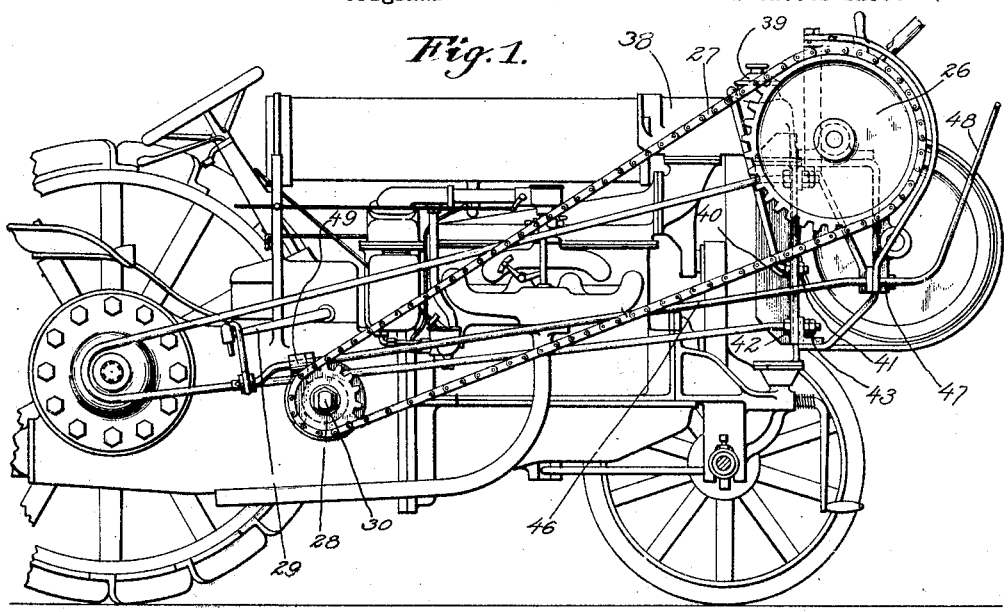
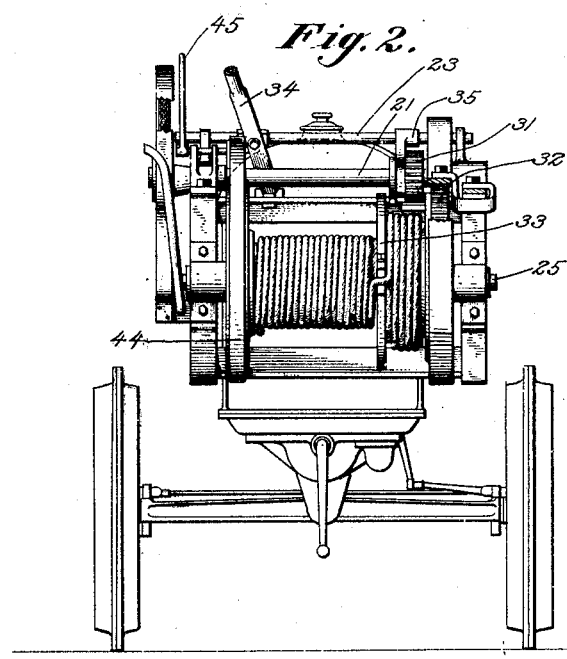
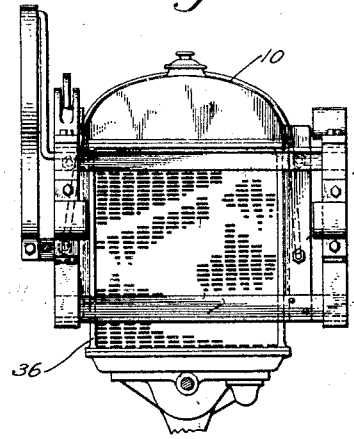
Harry S. Myers,
Inventor
By Wm. D. Shoemaker
Attorney July 24, 1928.
H. S. MYERS
1,678,158
HOIST ATTACHMENT FOR TRACTORS
Original Filed Oct. 10, 1922   2 Sheets-Sheet 2
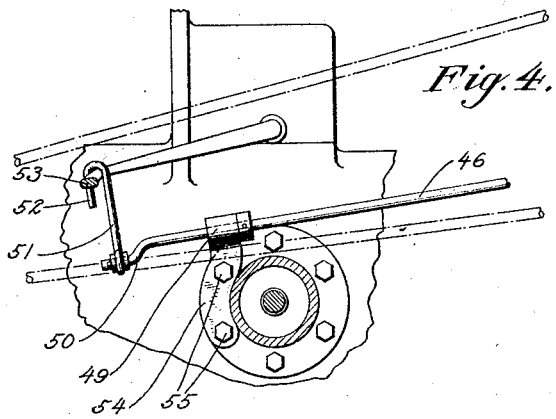
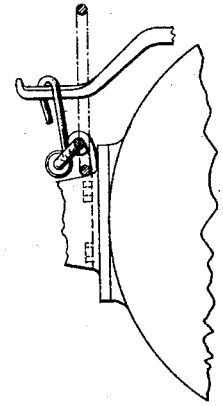
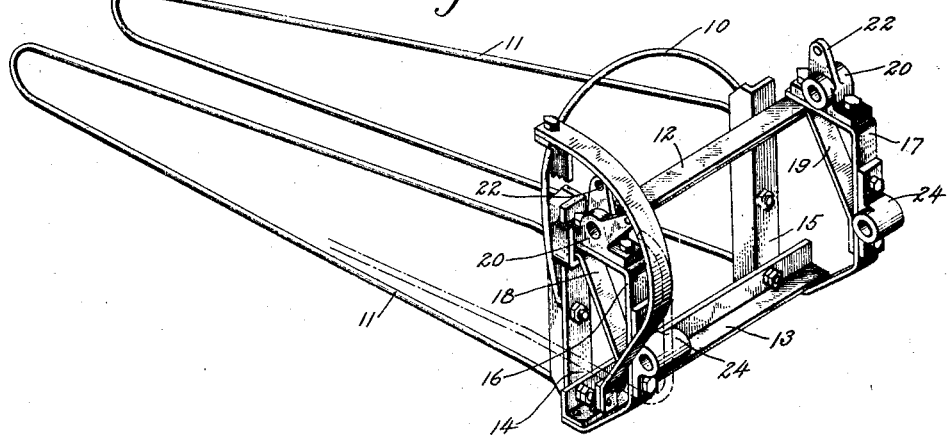
Inventor
Harry S. Myers.
By Wm. D. Shoemaker
Attorney Patented July 24, 1928.

1,678,158

UNITED STATES PATENT OFFICE.

HARRY S. MYERS, OF VAN, PENNSYLVANIA.

HOIST ATTACHMENT FOR TRACTORS.

Application filed October 10, 1922, Serial No. 593,592. Renewed March 7, 1927.

This invention relates to a hoist attachment for tractors, and more particularly to such an attachment designed to be attached to the front of a tractor, driven from the belt pulley shaft thereof, and controlled by the operative from a point at one side of the front end of the tractor.

It has for its object the provision of a winch or hoist attachment for a tractor to be carried upon the front end thereof, and driven with power from the tractor engine through the belt pulley shaft and controlled by an operative from the tractor seat or from a position at the front of the tractor. A further object is the production of a novel means for mounting the attachment upon the tractor and one in which the strains placed upon the winch or hoist will be borne by portions of the tractor capable of sustaining them. A further object is the production of a simple mounting for such a winch or hoist attachment upon the framework of the radiator of the tractor.

Other objects and advantages of the invention will hereinafter appear in the following description, and the novel features thereof will be particularly pointed out in the appended claims.

Like reference numerals indicate like parts throughout the several figures of the drawings, in which Figure 1 is a side elevation of a tractor of the Fordson type with the wheels upon one side removed and showing the winch or hoist attachment of my invention applied thereto;

Figure 2 is a front elevation of such a tractor with hoist attachment thereon;

Figure 3 is a view of the radiator framework of a tractor with the frame of my hoist or winch attached thereto, active elements of the winch having been removed;

Figure 4 is a side elevation of a portion of the tractor, showing the extension clutch control for the winch attachment;

Figure 5 is a detail of said extension clutch control, and

Figure 6 is a perspective of the frame of the winch or hoist attachment with active elements removed, and showing the bail and stirrups by means of which the frame is supported and held upon the front end of the tractor.

My invention is susceptible of a number of embodiments; that shown and described in this specification is one of them which has been found practicable in construction and operation. It must, however, be taken as indicative of the invention only.

The invention may be said to consist of a winch framework shown in perspective in Figure 6, and in elevation in Figure 3, which framework carries the active elements of the winch. For mounting the winch or hoist upon the tractor front end, there are provided a bail 10 and stirrups 11. For controlling the movement of the winch, there is provided an extension clutch control, shown more particularly in Figures 1, 4, and 5. These parts will now be described, and their individual functions pointed out, after which a recital of their conjoint use will be given.

Referring to Figure 6, the framework of my winch attachment comprises crossrails 12 and 13 connected by vertical rails 14 and 15, all of angle iron of suitable size. At the ends of the cross rails are arched bearing supporting members 16 and 17 suitably braced by the straps 18 and 19.

In the bearings 20 may be mounted a drive shaft 21, and in the apertured ears 22 may be mounted a shift rod 23, while in the bearings 24 may be mounted the winding drum shaft 25. All of these parts are somewhat similar to these same elements described in Patent Number 1,557,470 dated October 13, 1925, issued on my copending application Serial Number 518,980, filed November 30, 1921, and a more detailed description thereof need not be given in this specification.

Upon the end of the shaft 21, there is mounted a sprocket 26, which is driven through the chain 27 from the drive sprocket 28 upon the end of the belt pulley shaft, with which it is customary to equip tractors of this general type. It will be understood that this belt pulley shaft is driven from the engine of the tractor as long as the engine is running and when the tractor clutch pedal 29 is in normal or engaged condition. Power received from the belt pulley shaft 30 will be transmitted through sprocket 26, shaft 21, and sliding pinion 31 to gear 32 upon the end of the drum 33. It will be appreciated that the lever 34 and yoke 35 mounted upon the rod 23 constitute the means whereby the pinion 31 may be shifted into and out of engagement with the gear 32.

Referring now more particularly to Figure 3, it will be seen that the vertical angle members 14 and 15 are spaced apart just a sufficient distance to lie upon either side of the framework 36 of the radiator of the tractor and that the cross rails 12 and 13 will lie against the face of said radiator framework, as shown in Figure 1. The vertical members 14, and 15 carry a bail 10 formed of a single piece of iron stock of sufficient strength. This bail comprising an arched portion conforming to the contour of the upper surface of the tractor water tank 38, engages the same beyond the mouth 39 into which water is poured in filling the tractor radiator.

The leg portions of this bail terminate in bent ends which are screwthreaded to receive nuts 40 and 41, the said bent ends being passed through the angle members 14 and 15.

It will be appreciated that this bail in conjunction with the outstanding flanges of the angle members 14 and 15 will support a winch framework against the face of the radiator. However in the operation of the winch a pull or strain upon the frame would cause the winch to be pulled away from the radiator. In order that the winch may be held under such strain firmly against the radiator, and the strain placed upon parts of the tractor strong enough to bear them, I have provided stirrups 11, 11, which extend rearwardly and pass around the axle housing of the tractor. The legs of these stirrups are slightly bent at their forward ends and screwthreaded. These ends pass through apertures in the members 14 and 15 and the cross rails 12 and 13, constituting the means for connecting these elements of the winch framework together. Suitable nuts 42, and 43 are provided to produce a clamping engagement of the parts. It will be appreciated that by the use of the stirrups 11, 11, the winch attachment is clamped against the edges of the radiator framework and that any pulling strain placed upon the drum is transmitted to the axle housing which is of sufficient strength as to bear it.

I have selected for the purpose of illustration as the means for driving the winch from the power plant of the tractor a small sprocket 28 mounted upon the end of the belt pulley shaft 30 and the drive sprocket 26 fixed upon the drive shaft 23 of the hoist attachment connected by means of the chain 27. It is obvious, however, that other means may be employed to accomplish this result. For the purpose of controlling the movements of the winch, I have provided a brake drum 44 upon one end of the spool actuated by the lever 45 (more fully described in my patent numbered 1,413,421, April 18, 1922) and in addition the extension clutch control similar in many respects to that set forth in my patent numbered 1,418,265, May 30, 1922.

This extension clutch control comprises a rod 46 journalled at one end 47 in the frame work of the winch and provided there with the handle 48 and at its opposite end in the bearing 49, shown in detail in Figure 4. This rod 46 is provided with the crank end 50 on which is pivotally mounted the link 51 with its end 52 over the clutch pedal 53. This operation will cause the belt pulley shaft 30 to be disconnected from the engine, it being remembered that the bevel gear of the belt pulley shaft meshes with the transmission mechanism behind the clutch but in advance of the gear shift.

Referring to Figures 4 and 5, it will be seen that the bearing 49 is formed upon the end of a strap, whose body 54 is curved and attached to the tractor by means of the machine screws 55 which hold the belt pulley shaft housing to the tractor. As shown in Figure 5, the upper end of the strap is bent away from the tractor body so that the crank end 50 may be rotated in the depression of the clutch pedal beyond a dead center, coming into contact with the tractor body, when it will be automatically held with the clutch in released position.

In assembling the parts of my hoist attachment, it will be appreciated that the relative position of the parts of the winch is the reverse of those disclosed in my prior application for patent, so that the controls will all be upon the side of the machine having the belt pulley. For this purpose no change in design of the winch parts is necessary with the exception of the vertical rails 14 and 15 which are spaced further apart. The frame of the winch attachment is then equipped with the bail or saddle 10. It may be placed into a position on the tractor where the bail or saddle can be engaged over the mouth 39 and the vertical rails placed to either side of the radiator. In this position it will be seen that the attachment is held suspended upon the tractor.

The stirrups or stay rods 11 are now made to straddle the two ends of the axle housing and the legs thereof are attached to the winch frame in the manner described. This will cause the winch frame to be clamped to the radiator frame, and will have the effect of placing the pulling strain of the winch while in operation upon the axle housing, which is designed to bear heavy strains.

While I have shown and described the stirrups or stay bolts as connecting the cross rails to the vertical rails, it will be appreciated that they may be attached to the vertical rails by special apertures, and that the cross rails and vertical rails may be permanently connected by short bolts.

It will be appreciated that I have devised a winch attachment for tractors, which may be mounted upon a Fordson tractor without changing the tractor construction in any particular, and one which will place the strains where they may be born with ease.

Having described my invention, what I claim as new, and desire to secure by Letters Patent is—

1. In combination with a tractor whose body is made up of sections including a rear axle housing, of a frame carrying active winch elements mounted on the front of said tractor, means for holding said frame against vertical movement, and a rod bent to encircle the axle housing of the tractor and having its ends attached to said winch frame.

2. In a winch attachment for tractors, a frame carrying active winch elements, a bail or saddle for suspending said winch frame from the front end of said tractor, and stirrups extending from said winch frame and passing around the axle housings at the rear of said tractor for holding said winch frame to the front end of said tractor and transmitting the strains on said winch elements to the body of the tractor.

3. In a winch attachment for tractors, a frame carrying active winch elements adapted to be attached to the front end of said tractor, and comprising cross rails and vertical rails, said vertical rails having flanges adapted to straddle the front end of the tractor, a bail or saddle carried by said vertical rails for suspending the frame from the tractor, and stirrups or stayrods extending from said vertical rails to the rear axle housing to brace said winch frame against said tractor front end and bear the strains of said winch operation.

In testimony whereof I affix my signature.

HARRY S. MYERS.